UNITED STATES PATENT OFFICE.

CLARENCE P. EYRE, OF CHICAGO, ILLINOIS, ASSIGNOR TO THE NUTRIMENT COMPANY, OF SAME PLACE.

MILK-COAGULATING PRODUCT.

SPECIFICATION forming part of Letters Patent No. 491,416, dated February 7, 1893.

Application filed November 29, 1890. Serial No. 373,080. (No specimens.)

*To all whom it may concern:*

Be it known that I, CLARENCE P. EYRE, a citizen of the United States, residing at Chicago, in the county of Cook and State of Illinois, have invented certain new and useful Improvements in Milk-Coagulating Products; and I do hereby declare the following to be a full, clear, and exact description of the invention, such as will enable others skilled in the art to which it appertains to make and use the same.

The object of the present invention is to present rennet in a more convenient and a better form for use than heretofore, and in a condition in which it will remain more permanent as a preparation. Heretofore, rennet has been employed in the condition in which the inner membrane of the stomach is taken from the calf, and fresh, preserved in salt, or dried, or it has been employed in the nature of an infusion. The point of the present invention is to dispense with the liquid preparations of rennet, since they are not convenient for use and are apt to spoil by fermenting or becoming moldy, and to exhibit the milk-coagulating principle of the rennet, or the renning itself, in solid form, without having it associated with the detrimental matter, as where pieces of the membrane direct are employed.

The mode of procedure to produce this new, useful and desirable product is as follows:

I prepare a solution of the milk-coagulating ferment, or renning, entirely or nearly free from the digestive ferment, or pepsin, for example, as follows: I take the cardiac portion of the mucous lining of the stomach of the hog, calf or other suitable animal, which portion I have discovered contains a large number of cells secreting the milk-coagulating ferment, renning, and very few pepsin-secreting cells, wash, chop fine, dry, reduce to a fine powder, and macerate it for four days, with frequent agitation in water containing five per cent. of hydrochloric acid, *United States Pharmacopœia*, in the proportion, preferably, of one part by weight of dried membrane to four parts of acidulated water. I then filter and cautiously add a concentrated solution of magnesium sulphate, until almost all of the pepsin contained in the liquid is precipitated, the excess of magnesium sulphate being then removed by addition of ammonium hydrate in slight excess. The liquid is then filtered. The filtrate is a nearly pure solution of the milk-coagulating ferment, renning. I now evaporate this solution in vacuo, at a temperature not exceeding 105° Fahrenheit, until it is reduced to a dense sirupy mass. This is then assayed in order to ascertain the quantity required to coagulate a given quantity of milk. It is then mixed with powdered sugar or starch, or other proper inert substance, and dried,—as by a current of hot air. I prefer to add sugar in such proportion that one teaspoonful of the finished product will coagulate one pint of milk in five minutes at 105° Fahrenheit, though the strength may be varied as desired. When the sugar or starch is mixed with the sirupy mass, this becomes moist and in that condition is pressed through a sieve, producing granules, which is the preferred form; but the product may be in powder or other form. Either as a powder or granulated, it presents a very elegant preparation with the renning in its best form, suitable and ready for practical and convenient use. The dry preparation will last indefinitely with ordinary care.

It is to be understood that the product may be dampened, without departing from the spirit of my invention, as by adding glycerine or some other preservative liquid. I have thus, not only exhibited the milk-coagulating ferment, that is, renning, in a form which presents the advantages of convenience, of perfect preservation, and of freedom from impurities, such as mucus, and animal matter; but, by my invention, the renning is exhibited in a nearly isolated condition practically free even from pepsin, &c., the presence of which would have a diluent effect, so that the specific milk-coagulating action of the renning alone with the maximum effect is obtained from a given quantity.

Having thus fully described my invention, what I claim as new and desire to secure by Letters-Patent, is:

The described renning product, being a milk-coagulating ferment, exhibited in solid form, practically free from pepsin, trypsin, &c., whereby the specific milk-coagulating action of the renning alone is obtained, from any given quantity, substantially as described.

In testimony whereof I affix my signature in presence of two witnesses.

CLARENCE P. EYRE.

Witnesses:
R. G. DYRENFORTH,
G. B. KREPER.